(12) United States Patent
Chung et al.

(10) Patent No.: US 11,792,262 B1
(45) Date of Patent: Oct. 17, 2023

(54) SYSTEM AND METHOD FOR DATA MOVEMENT

(71) Applicant: The Toronto-Dominion Bank, Toronto (CA)

(72) Inventors: Sherman Chung, Toronto (CA); Upal Sayeed Hossain, Toronto (CA); Morgan Aguiar, Toronto (CA); Laxmi Prasanthi Velamakanni, Markham (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/869,070

(22) Filed: Jul. 20, 2022

(51) Int. Cl.
*H04L 67/1095* (2022.01)
(52) U.S. Cl.
CPC .................... *H04L 67/1095* (2013.01)
(58) Field of Classification Search
None
See application file for complete search history.

(56) References Cited

U.S. PATENT DOCUMENTS

| | | |
|---|---|---|
| 8,285,681 B2 | 10/2012 | Prahlad et al. |
| 9,426,219 B1 | 8/2016 | Keyser |
| 9,619,148 B2 | 4/2017 | Bowman et al. |
| 9,811,849 B2 | 11/2017 | Bursey |
| 10,282,092 B1 | 5/2019 | Jain |
| 10,620,871 B1 | 4/2020 | Mukku et al. |
| 11,023,332 B2 | 6/2021 | Perneti et al. |
| 11,030,166 B2 * | 6/2021 | Swamy ................ G06F 16/258 |
| 11,082,333 B1 * | 8/2021 | Lam ...................... H04L 47/803 |
| 11,132,141 B2 | 9/2021 | Cherian et al. |

(Continued)

FOREIGN PATENT DOCUMENTS

| | | |
|---|---|---|
| CN | 113259447 A | 8/2021 |
| CN | 114048186 A | 2/2022 |

OTHER PUBLICATIONS

Saraswat et al., "Cloud Computing: Comparison and Analysis of Cloud Service Providers-AWs, Microsoft and Google", Dec. 4, 2020, IEEE, 2020 9th International Conference System Modeling and Advancement in Research Trends (SMART) (pp. 281-285) ( Year: 2020).*

*Primary Examiner* — Davoud A Zand
(74) *Attorney, Agent, or Firm* — Curtis B. Behmann; BORDEN LADNER GERVAIS LLP

(57) ABSTRACT

Computing platforms, methods, and storage media for data movement are disclosed. Exemplary implementations may: obtain a data transfer command including a table-based characterization of a set of data to be transferred from an on-premise platform to a cloud platform, the data transfer command further including a date specification; automatically determine, based on the table-based characterization of the data to be transferred and based on the date specification, a set of files to be transferred; and initiate transfer of the set of files from the on-premise platform to the cloud platform. In an implementation, data is moved at the table level, and the files associated with the specified tables/date range are automatically determined. A single command, which may reference a CSV file, may be used to efficiently and reliably transfer a large amount of data without a user having to specify the specific files to be transferred.

20 Claims, 6 Drawing Sheets

(56) References Cited

U.S. PATENT DOCUMENTS

| | | |
|---|---|---|
| 11,256,419 B2 | 2/2022 | Miyawaki et al. |
| 2012/0254555 A1 | 10/2012 | Miwa et al. |
| 2015/0186488 A1* | 7/2015 | Fischer ............... G06F 11/1471 |
| | | 707/615 |
| 2018/0047005 A1* | 2/2018 | Bilgen ................. G06Q 20/209 |
| 2021/0234713 A1 | 7/2021 | Nagasawa et al. |
| 2021/0303522 A1 | 9/2021 | Periyagaram et al. |
| 2022/0075563 A1 | 3/2022 | Kishida et al. |

* cited by examiner

SYSTEM AND METHOD FOR DATA MOVEMENT

FIELD

The present disclosure relates to data transfers, including but not limited to computing platforms, methods, and storage media for data movement.

BACKGROUND

In computing platforms and systems, it is often necessary to move data from one location to another, such as for a data migration. As the amount data increases, existing approaches for moving data become constrained or have limitations.

While there are some approaches using a "data box" to move a large amount of data, this requires a physical box to be brought in and connected to devices in the system. Other data transfer approaches have limitations when operating with data in the range of 1 PB, for example when moving data from an existing data center into the cloud.

Improvements in approaches for data movement are desirable.

BRIEF DESCRIPTION OF THE DRAWINGS

Embodiments of the present disclosure will now be described, by way of example only, with reference to the attached Figures.

DETAILED DESCRIPTION

Figure 1:
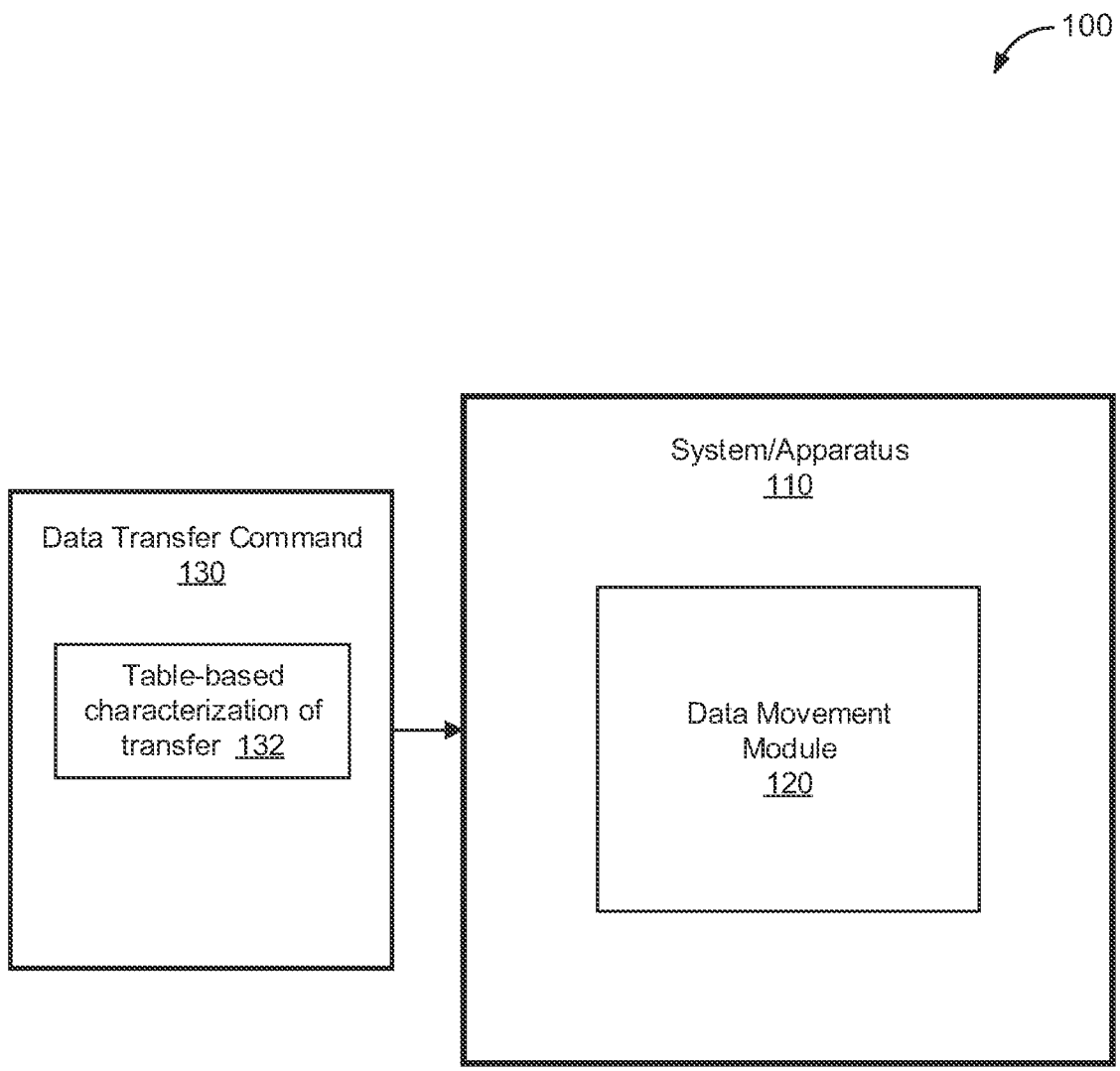
FIG. 1 illustrates a system configured for data movement, in accordance with one or more embodiments.

Computing platforms, methods, and storage media for data movement are disclosed. Exemplary implementations may: obtain a data transfer command including a table-based characterization of a set of data to be transferred from an on-premise platform to a cloud platform, the data transfer command further including a date specification; automatically determine, based on the table-based characterization of the data to be transferred and based on the date specification, a set of files to be transferred; and initiate transfer of the set of files from the on-premise platform to the cloud platform.

Embodiments of the present disclosure provide a data movement framework that moves data at the table level, and automatically determines the files associated with the specified tables/date range.

In accordance with one or more embodiments, a data movement framework can move over 1 PB of data from a classic on-premise storage to the cloud. Rather than moving data at the file level as per known approaches, embodiments of the present disclosure specify data to be moved at the table level. A data transfer command may specify tables to be moved, and may include a date range. A parser in the framework may determine, based on the data tables and date range specified in the command, the specific files to be transferred. A framework in accordance with one or more embodiments is configured to use a single command, which may reference a CSV file, to efficiently and reliably transfer a large amount of data without a user having to specify the specific files to be transferred.

One aspect of the present disclosure relates to a computing platform configured for data movement. The computing platform may include a non-transient computer-readable storage medium having executable instructions embodied thereon. The computing platform may include one or more hardware processors configured to execute the instructions. The processor(s) may execute the instructions to obtain a data transfer command. The data transfer command may include a table-based characterization of a set of data to be transferred from an on-premise platform to a cloud platform. The data transfer command may further include a date specification. The processor(s) may execute the instructions to automatically determine, based on the table-based characterization of the data to be transferred and based on the date specification, a set of files to be transferred. The set of files may be associated with the table-based characterization of the set of data to be transferred. The processor(s) may execute the instructions to initiate transfer of the set of files from the on-premise platform to the cloud platform.

Another aspect of the present disclosure relates to a method for data movement. The method may include obtaining a data transfer command. The data transfer command may include a table-based characterization of a set of data to be transferred from an on-premise platform to a cloud platform. The data transfer command may further include a date specification. The method may include automatically determining, based on the table-based characterization of the data to be transferred and based on the date specification, a set of files to be transferred. The set of files may be associated with the table-based characterization of the set of data to be transferred. The method may include initiating transfer of the set of files from the on-premise platform to the cloud platform.

Yet another aspect of the present disclosure relates to a non-transient computer-readable storage medium having instructions embodied thereon, the instructions being executable by one or more processors to perform a method for data movement. The method may include obtaining a data transfer command. The data transfer command may include a table-based characterization of a set of data to be transferred from an on-premise platform to a cloud platform. The data transfer command may further include a date specification. The method may include automatically determining, based on the table-based characterization of the data to be transferred and based on the date specification, a set of files to be transferred. The set of files may be associated with the table-based characterization of the set of data to be transferred. The method may include initiating transfer of the set of files from the on-premise platform to the cloud platform.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

FIG. 1 illustrates a computing platform 100 configured for data movement, in accordance with one or more embodiments. In an embodiment, the computing platform 100 comprises a data movement framework. The computing platform 100 may comprise a system or apparatus 110, which includes one or more data movement modules 120. The computing platform may include a non-transient computer-readable storage medium having executable instructions embodied thereon. The computing platform may include one or more hardware processors configured to execute the instructions.

In accordance with one or more embodiments, the data movement framework 100 is configured for data movement from an on-premise platform to a cloud platform, for example from an on-premise storage system to a cloud storage system. In an embodiment, the data movement framework 100 is in communication with the on-premise platform and with the cloud platform. In an embodiment, the data movement framework 100 may be provided in whole or in part at the on-premise platform. In an embodiment, the data movement framework 100 may be provided in whole or in part at the on-premise platform, at the cloud platform, and/or at a location separate from the on-premise platform and the cloud platform.

The processor(s) may execute the instructions to obtain a data transfer command 130. The data transfer command 130 may include a table-based characterization 132 of a set of data to be transferred from an on-premise platform to a cloud platform. The data transfer command 130 may further include a date specification. The processor(s) may execute the instructions to automatically determine, based on the table-based characterization of the data to be transferred and based on the date specification, a set of files to be transferred. The set of files may be associated with the table-based characterization of the set of data to be transferred. The processor(s) may execute the instructions to initiate transfer of the set of files from the on-premise platform to the cloud platform.

In contrast to the known approach of having to provide a list of every single individual file to be included in a data movement, embodiments of the present disclosure provide a framework that enables a data transfer command to specify a date range, and automatically determine the associated files, without the data transfer command having to specify the files. As will be described later, the data transfer command 130 may comprise a single line of code. This is in contrast to known approaches which specify a huge number of entries, perhaps a million entries, to specify the location of file A, file B, etc. Embodiments of the present disclosure provide a technical solution that drastically simplifies the amount and type of information to be provided, for example in the data transfer command 130, making it a very easy matter to transfer data across to the cloud.

The on-premise platform may comprise one or more edge stage nodes. In accordance with one or more embodiments, the system or data movement framework 100 may comprise, at the one or more edge stage nodes within the on-premise platform, a distributed light application. The light application may be configured to obtain a subset of the set of files from a storage cluster of the on-premise platform. The light application may be configured store the subset of the set of files at the one or more edge stage nodes in an encrypted form.

In an implementation, the light application may comprise a PySpark component provided on a Hadoop edge node, or edge stage node. The application may be configured to run on one or more edge stage nodes as a distributed application. The framework may deploy the application to take a list of commands, go into the cluster, and put the data into a physical edge node, rather than in the cluster. In an example embodiment, such data is no longer in the cluster, and is now stored in a physical edge node, where it may be stored and prepared to be send out. Advantageously, the edge stage node may have additional encryption, so that the data is encrypted at rest. All of the IDs in the framework may have the privileges to move the data.

In an example embodiment, one or more hardware processors associated with the system 100 are further configured to execute instructions to perform a distributed initiation of the transfer of the set of files by splitting up the transfer into a plurality of transfer processes to be performed in a distributed manner at the one or more edge stage nodes. Such an embodiment provides enhanced functionality by performing actions in a parallel manner at the one or more edge stage nodes, improving efficiency of the computing devices on which the operations are performed, compared to if they were all performed by a single device.

In an example embodiment, the one or more hardware processors associated with the system 100 are further configured to execute the instructions to: automatically determine data partitions in the on-premise platform associated with the date specification, and to automatically specify the set of files to be transferred from the storage cluster to the one or more edge stage nodes, then to the cloud platform. Such functionality will be described later in more detail in relation to specific embodiments in relation to a parser, or parser module.

A data movement framework 100 in accordance with one or more embodiments may run an automated process, or may be initiated manually. To run manually, a user goes through a number of steps to run a data movement process. To go through an automated process, a data transfer command 130 is provided, for example by a user providing a file with a specific naming convention. The system then processes the file based on the naming convention, and automatically runs the appropriate process, including everything from the physical files, audit information, and other data.

In accordance with one or more embodiments, the data transfer command 130 may include a configuration filename making reference to and/or associated with a configuration file. In such an implementation, the one or more hardware processors associated with the system 100 may be configured to execute the instructions to automatically determine the set of files to be transferred based on at least one of the configuration filename and contents of the configuration file. In this way, embodiments of the present disclosure provide a technical advantage in the operation of a computing device processing the data transfer command, by embedding information about the data transfer in the configuration filename itself. This advantageously uses a filename in a different way than it was intended, which is to represent the contents of the file, and instead represents a desired operation to be performed with respect to the contents of the file.

In an implementation, the data transfer command 130 comprises one line of code including a receiving location (e.g. malcode to move over), a start date and end date. In an example implementation, the file comprises a comma separated variable (CSV) file, and the name of the file defines the process to be used. The physical information in the CSV may define the database, the file, start and end date, e.g. 2017-01-01, and 2022-04-01.

The data movement framework 100, based on the received data transfer command 130, may obtain all of the information about files that satisfy the criteria, and put it into a format that allows the data to be moved across. The receive location may already be known based on the use case.

An example of a one line command is:

/podium/receiving/cif/table1,20220304,20220307 where "table1" comprises the file name, "20220304" comprises the start date, and "20220307" comprises the end date.

Whatever number of files are in the specified date range, a user does not have to define any of the technical details, as the data movement framework 100 is configured to determine the associated details based on the criteria specified in the data move command. The command 130 may refer to a CSV file with a filename like History01, which may be used to specify that a historical data movement process is to be executed with respect to the contents of the data transfer command and/or the CSV file.

Embodiments of the present disclosure provide a technical advantage that improves the operation of the data movement framework, using less processing power and less memory compared to known approaches, by only requiring the data transfer command to specify a date range, and automatically determining the files associated with that date range. Embodiments of the present disclosure also help to avoid manual or human error associated with specifying each individual file to be moved, by only requiring a date range to be specified, and automatically determining the files associated with that date range, and providing that information for the data movement.

In today's known processes, if a user needs to move data, the user needs to do it at the file level. Embodiments of the present disclosure may advantageously aggregate the applicable files based on pre-configured requirements or parameters. The framework may divide the data movement into priorities based on multiple groups. Using known processes, users had to make sure that their commands dictated all of the files in the table. Now, using a data movement framework in accordance with one or more embodiments, all that is required is to know the retention policy, for example as defined by a start date and an end date. The system is configured to make the required determinations, for example determining the underlying data and files associated with the command at the table level. The system in accordance with one or more embodiments enables different migration teams to do this for all of their migration needs.

In an example embodiment, the set of data to be transferred comprises a first data subset, and the one or more hardware processors associated with the system 100 are further configured to execute instructions to automatically delete the first data subset from the on-premise platform in response to a validation check confirming that the first data subset has been successfully moved over to the cloud platform.

In an example embodiment, one or more hardware processors associated with the system 100 are further configured to execute instructions to initiate a table-based transfer of the set of files from the on-premise platform to the cloud platform based on the table-based characterization of the data to be transferred and based on the date specification.

In an example embodiment, one or more hardware processors associated with the system 100 are further configured to execute instructions to automatically determine the set of files to be transferred based on the table-based characterization of the data to be transferred and based on the date specification and independent from a file-based characterization of the set of data to be transferred.

In an example embodiment, one or more hardware processors associated with the system 100 are further configured to execute instructions to compare the table-based characterization of the set of data to be transferred with known characterizations of previously transferred data; and determine whether the set of data to be transferred includes previously transferred data, to avoid data transfer duplication. This provides a technical improvement with respect to functionality and operation of the system 100, as well as the associated components, by preventing unnecessary and/or duplicative data transfers. This also provides a technical improvement of reducing bandwidth usage, by avoiding unnecessary use of bandwidth due to duplicate data transfers.

According to one or more embodiments, the present disclosure provides a data movement framework that moves data at the table level, rather than at the file level, and automatically determines the files associated with the specified tables/date range.

In an example implementation, a historical migration pod may focus on multiple data movement patterns from an on-premise device or apparatus, to a cloud device or apparatus, such as Azure Cloud. In accordance with one or more embodiments, parallel streams may be used to enable migration to cloud. In one example implementation, the system is configured to move 1.25 PB of data from an on-premise data center to a cloud center for historical data from a parsed zone. The approach may also deliver an on-premise archival solution to avoid hardware expansion on premise, may provide a solution for the Java legacy conversion framework (one entity in cloud pattern), and may enable E-Compare functionality and a testing framework. An e-compare functionality may comprise a tool configured to test and validate an audit handshake to enable data sources to be used in the cloud.

In some legacy systems, there may be overlaps in projects that continue to ingest the same file, but on different systems. Such multiple ingestion often goes undetected. Embodiments of the present disclosure provide a custom solution to obtain data ingested by different frameworks from one or more data centers, so that sources do not have to ingest the data again in the cloud. This approach provides an improvement in the functioning of the data center hardware, by adding efficiency and removing the need for further data ingestion. Embodiments of the present disclosure make it so that the data does not have to be re-ingested.

In an example implementation, legacy files may have been archived in an on-premise system, and may not be used currently, but for retention purposes they must be maintained. Accordingly, these legacy files should advantageously find their way into the cloud for storage, even if they are not currently being used or accessed. Embodiments of the present disclosure enable a computing device to obtain data from current systems and previous systems, not just handling one pattern.

A known on-premise system may be described as a classic environment, for example an Enterprise Data Provisioning Platform (EDPP), which has different ingestion processes over time, including custom Java applications and other approaches. In accordance with one or more embodiments, supporting metadata is provided to assist in performing an e-compare function (audit handshake), for example by providing a checkbox that data can be removed or sunsetted on a "classic" platform that the cloud version may start being used.

A data movement framework of an embodiment of the present disclosure seeks to solve a problem of moving a large amount of data. A known approach of using an Azure data box would require using a physical box (a giant USB), bringing the box in and loading it across the board (boxes on armoured trucks, etc.). The data box is only allowed to have a specific size in Canada and the US (max 1 PB in US, or 100 TB in CA). This would require repeating the process many times, in addition to physically connecting a hard drive in their premises, with trucks crossing the border, and border patrol checking the data.

Another existing approach is to copy the data into a first data center, for example in Canada, then use the first center to copy the data to the a second data center, for example in the United States. However, this approach will not work if the first data center does not have the necessary certifications for holding encrypted data. A further existing approach, involving opening up a data center cluster to provide direct connectivity to all data sets, was deemed unsuitable due to privacy concerns, and because not all data is set to be migrated.

A system according to an embodiment of the present disclosure, for example as shown in FIG. 1, allows a system operator to secure the data and only drive what the business needs through the different checkpoints. In an example embodiment, the system is configured to enable multiple teams to give multiple handshakes.

In accordance with one or more embodiments, for example in relation to FIG. 1 and other figures herein, a data movement framework is configured to move in excess of 1 PB of data from a classic on-premise storage to the cloud. Rather than moving data at the file level, embodiments of the present disclosure specify, for example in data transfer command 130, data to be moved at the table level, for example using a table-based characterization 132. Data transfer command 130 may specify tables to be moved, including a date range. The computing platform 100 is configured to filter out files that have passed, and to move everything over with one line of code.

The framework 100 may add metadata and include the data in the cloud, and store it in the database to show that the moved data has no integrity issues. For example, such metadata may be supporting the information and the metadata may be brought into the cloud and stored in the database. The metadata may be used to enable calculation of migration statistics, and may also be used for compliance reasons to make sure every file that has made it over to the cloud has made it over and has no integrity issues. Depending on which switch the framework seeks to move the data through, any one of the following flows may be used: classic/historical flow; Java flow; archival flow.

Figure 2:
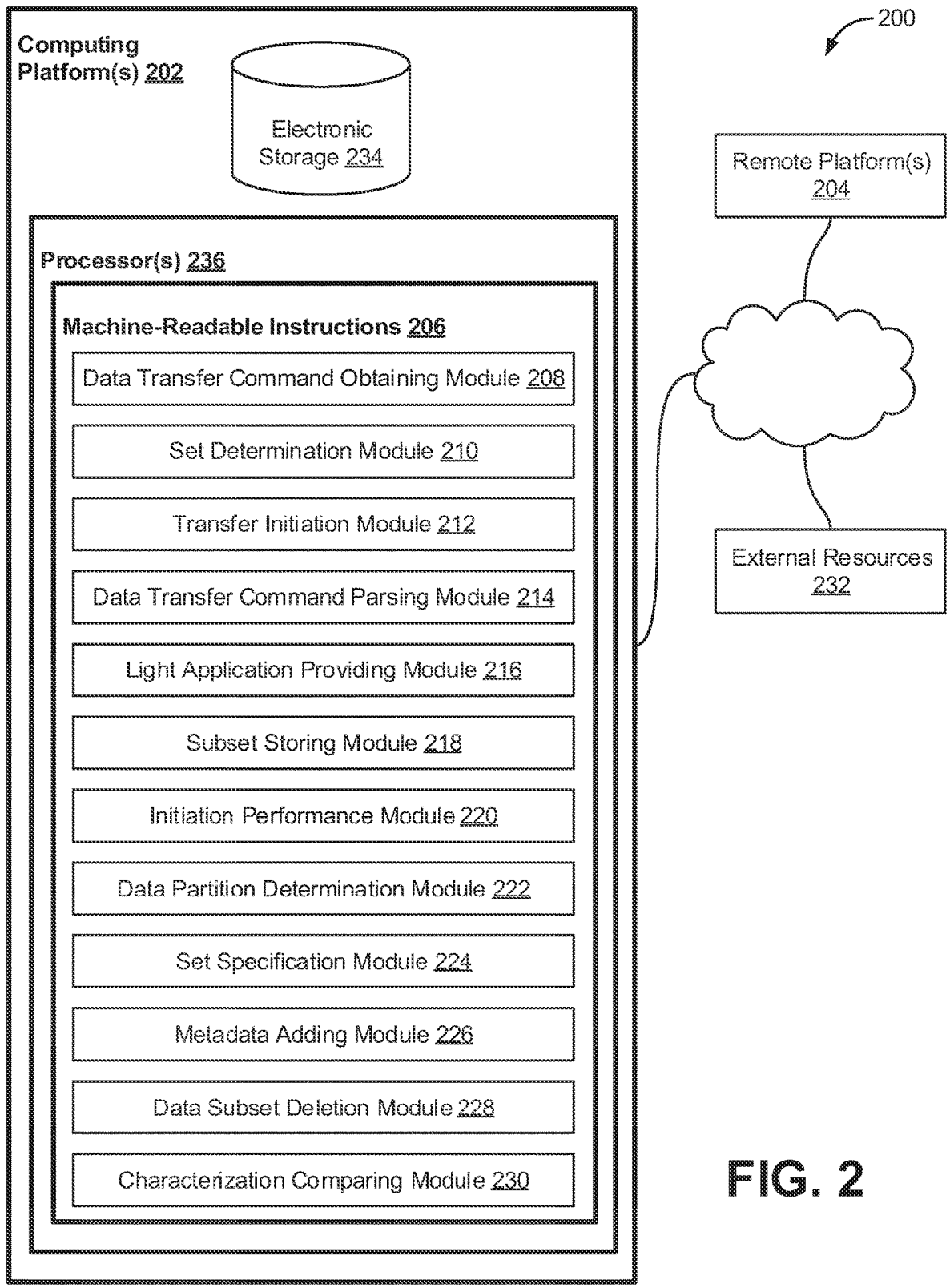
FIG. 2 illustrates another system configured for data movement, in accordance with one or more embodiments.

The data movement framework 100 may use a different partitioning strategy for each flow. The system may use an automated process for performing the job, for example including doing a bulk load from the sources. The framework may "hydrate" the data, for example making it usable for consumption in the cloud, pushed in a way that allows it to be in a standardized format FIG. 2 illustrates a system 200 configured for data movement, in accordance with one or more embodiments. In some embodiments, system 200 may include one or more computing platforms 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules. The instruction modules may include one or more of data transfer command obtaining module 208, set determination module 210, transfer initiation module 212, data transfer command parsing module 214, light application providing module 216, subset storing module 218, initiation performance module 220, data partition determination module 222, set specification module 224, metadata adding module 226, data subset deletion module 228, characterization comparing module 230, and/or other instruction modules.

Data transfer command obtaining module 208 may be configured to obtain a data transfer command. The data transfer command may include reference to a preparation file for parsing information. The data transfer command may include reference to one or more output files used to copy data. The data transfer command may include reference to one or more supporting log files used for logging processes. The data transfer command may include a configuration filename making reference to a configuration file. The configuration file may include a comma separated variable file providing details associated with the table-based characterization of the set of data to be transferred.

The data transfer command may include a table-based characterization of a set of data to be transferred from an on-premise platform to a cloud platform. The data transfer command may include a destination location at the cloud platform. The data transfer command may include a single line of code including a destination at the cloud platform. The data transfer command may further include a date specification. The date specification may include a start date and an end date.

Set determination module 210 may be configured to automatically determine, based on the table-based characterization of the data to be transferred and based on the date specification, a set of files to be transferred. The set of files may be associated with the table-based characterization of the set of data to be transferred.

Set determination module 210 may be configured to automatically determine the set of files to be transferred based on the table-based characterization of the data to be transferred and based on the date specification and independent from a file-based characterization of the set of data to be transferred.

Set determination module 210 may be configured to automatically determine the set of files to be transferred based on at least one of the configuration filename and contents of the configuration file.

Set determination module 210 may be configured to determine whether the set of data to be transferred includes previously transferred data, to avoid data transfer duplication.

Transfer initiation module 212 may be configured to initiate transfer of the set of files from the on-premise platform to the cloud platform. Transfer initiation module 212 may be configured to initiate the transfer of the set of files and the added metadata to the cloud platform.

Data transfer command parsing module 214 may be configured to parse the data transfer command using to automatically determine partitions associated with the table-based characterization of the data to be transferred.

Light application providing module 216 may be configured to provide, at one or more edge stage nodes within the on-premise platform, a distributed light application configured to obtain a subset of the set of files from a storage cluster of the on-premise platform and store the subset of the set of files at the one or more edge stage nodes in an encrypted form.

Subset storing module 218 may be configured to store the subset of the set of files at the one or more edge stage nodes prior to storing the subset of the set of files in the cloud platform.

Initiation performance module 220 may be configured to perform a distributed initiation of the transfer of the set of files by splitting up the transfer into a plurality of transfer processes to be performed in a distributed manner at the one or more edge stage nodes.

Data partition determination module 222 may be configured to automatically determine data partitions in the on-premise platform associated with the date specification.

Set specification module 224 may be configured to automatically specify the set of files to be transferred from the storage cluster to the one or more edge stage nodes then to the cloud platform.

Metadata adding module 226 may be configured to add metadata to the set of files to be transferred.

Data subset deletion module 228 may be configured to automatically delete the first data subset from the on-premise platform in response to a validation check confirming that the first data subset has been successfully moved over to the cloud platform.

Characterization comparing module 230 may be configured to compare the table-based characterization of the set of data to be transferred with known characterizations of previously transferred data. Initiating the transfer may include initiating a table-based transfer of the set of files from the on-premise platform to the cloud platform based on the table-based characterization of the data to be transferred and based on the date specification.

In some implementations, as discussed above, the configuration filename may define a data transfer process to be used.

In some embodiments, computing platform(s) 202, remote platform(s) 204, and/or external resources 232 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 232 may be operatively linked via some other communication media.

A given remote platform 204 may include one or more processors configured to execute computer program modules. The computer program modules may be configured to enable an expert or user associated with the given remote platform 204 to interface with system 200 and/or external resources 232, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 232 may include sources of information outside of system 200, external entities participating with system 200, and/or other resources. In some embodiments, some or all of the functionality attributed herein to external resources 232 may be provided by resources included in system 200.

Computing platform(s) 202 may include electronic storage 234, one or more processors 236, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 234 may comprise non-transitory storage media that electronically stores information. The electronic storage media of electronic storage 234 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 234 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 234 may include one or more virtual storage resources (e.g., cloud storage, a virtual private network, and/or other virtual storage resources). Electronic storage 234 may store software algorithms, information determined by processor(s) 236, information received from computing platform(s) 202, information received from remote platform(s) 204, and/or other information that enables computing platform(s) 202 to function as described herein.

Processor(s) 236 may be configured to provide information processing capabilities in computing platform(s) 202. As such, processor(s) 236 may include one or more of a digital processor, an analog processor, a digital circuit designed to process information, an analog circuit designed to process information, a state machine, and/or other mechanisms for electronically processing information. Although processor(s) 236 is shown in FIG. 2 as a single entity, this is for illustrative purposes only. In some embodiments, processor(s) 236 may include a plurality of processing units. These processing units may be physically located within the same device, or processor(s) 236 may represent processing functionality of a plurality of devices operating in coordination. Processor(s) 236 may be configured to execute modules 208, 210, 212, 214, 216, 218, 220, 222, 224, 226, 228, and/or 230, and/or other modules. Processor(s) 236 may be configured to execute modules 208, 210, 212, 214, 216, 218, 220, 222, 224, 226, 228, and/or 230, and/or other modules by software; hardware; firmware; some combination of software, hardware, and/or firmware; and/or other mechanisms for configuring processing capabilities on processor(s) 236. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, 216, 218, 220, 222, 224, 226, 228, and/or 230 are illustrated in FIG. 2 as being implemented within a single processing unit, in embodiments in which processor(s) 236 includes multiple processing units, one or more of modules 208, 210, 212, 214, 216, 218, 220, 222, 224, 226, 228, and/or 230 may be implemented remotely from the other modules. The description of the functionality provided by the different modules 208, 210, 212, 214, 216, 218, 220, 222, 224, 226, 228, and/or 230 described below is for illustrative purposes, and is not intended to be limiting, as any of modules 208, 210, 212, 214, 216, 218, 220, 222, 224, 226, 228, and/or 230 may provide more or less functionality than is described. For example, one or more of modules 208, 210, 212, 214, 216, 218, 220, 222, 224, 226, 228, and/or 230 may be eliminated, and some or all of its functionality may be provided by other ones of modules 208, 210, 212, 214, 216, 218, 220, 222, 224, 226, 228, and/or 230. As another example, processor(s) 236 may be configured to execute one or more additional modules that may perform some or all of the functionality attributed below to one of modules 208, 210, 212, 214, 216, 218, 220, 222, 224, 226, 228, and/or 230.

Figure 3:
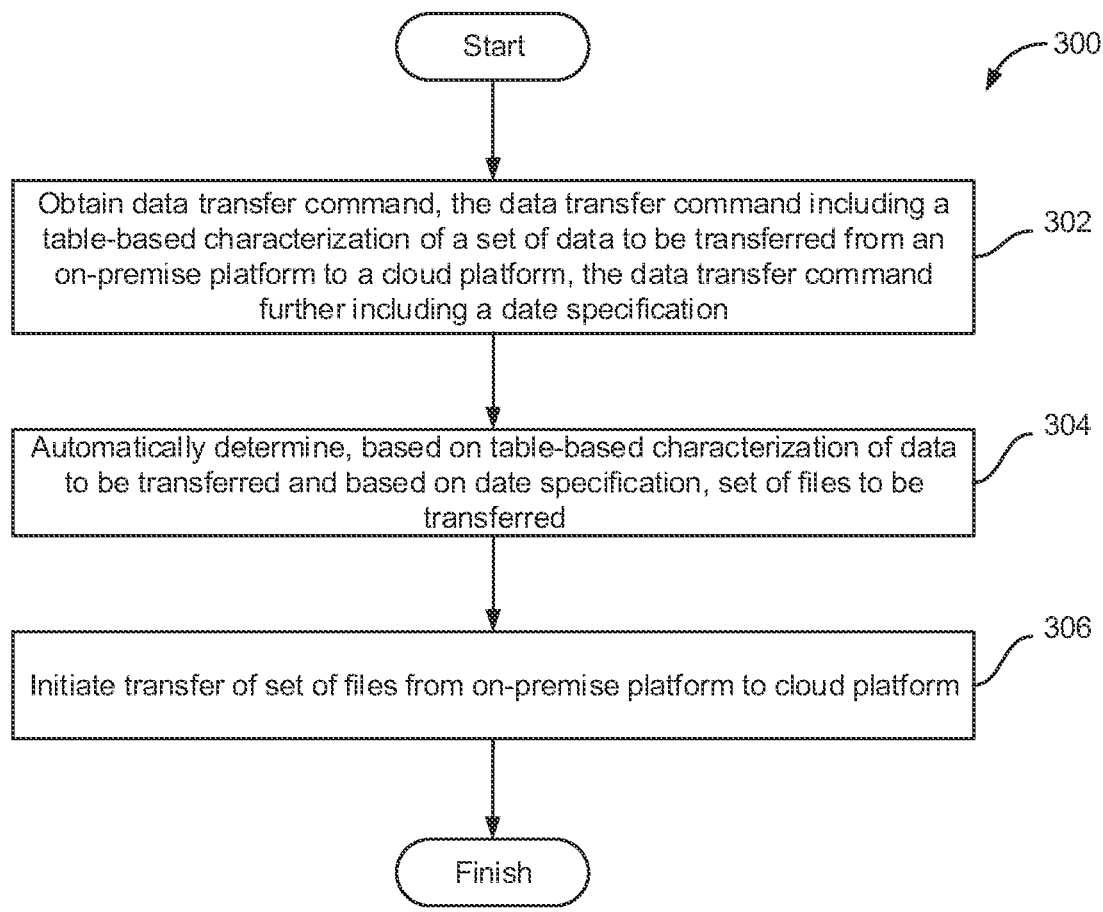
FIG. 3 illustrates a method for data movement, in accordance with one or more embodiments.

FIG. 3 illustrates a method 300 for data movement, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include obtaining a data transfer command. The data transfer command may include a table-based characterization of a set of data to be transferred from an on-premise platform to a cloud platform. The data transfer command may further include a date specification. Operation 302 may be performed by one or more hardware processors configured by machine-readable instructions including a module that is the same as or similar to data transfer command obtaining module 208, in accordance with one or more embodiments.

An operation 304 may include automatically determining, based on the table-based characterization of the data to be transferred and based on the date specification, a set of files to be transferred. The set of files may be associated with the table-based characterization of the set of data to be transferred. Operation 304 may be performed by one or more hardware processors configured by machine-readable instructions including a module that is the same as or similar to set determination module 210, in accordance with one or more embodiments.

An operation 306 may include initiating transfer of the set of files from the on-premise platform to the cloud platform. Operation 306 may be performed by one or more hardware processors configured by machine-readable instructions including a module that is the same as or similar to transfer initiation module 212, in accordance with one or more embodiments.

Figure 4:
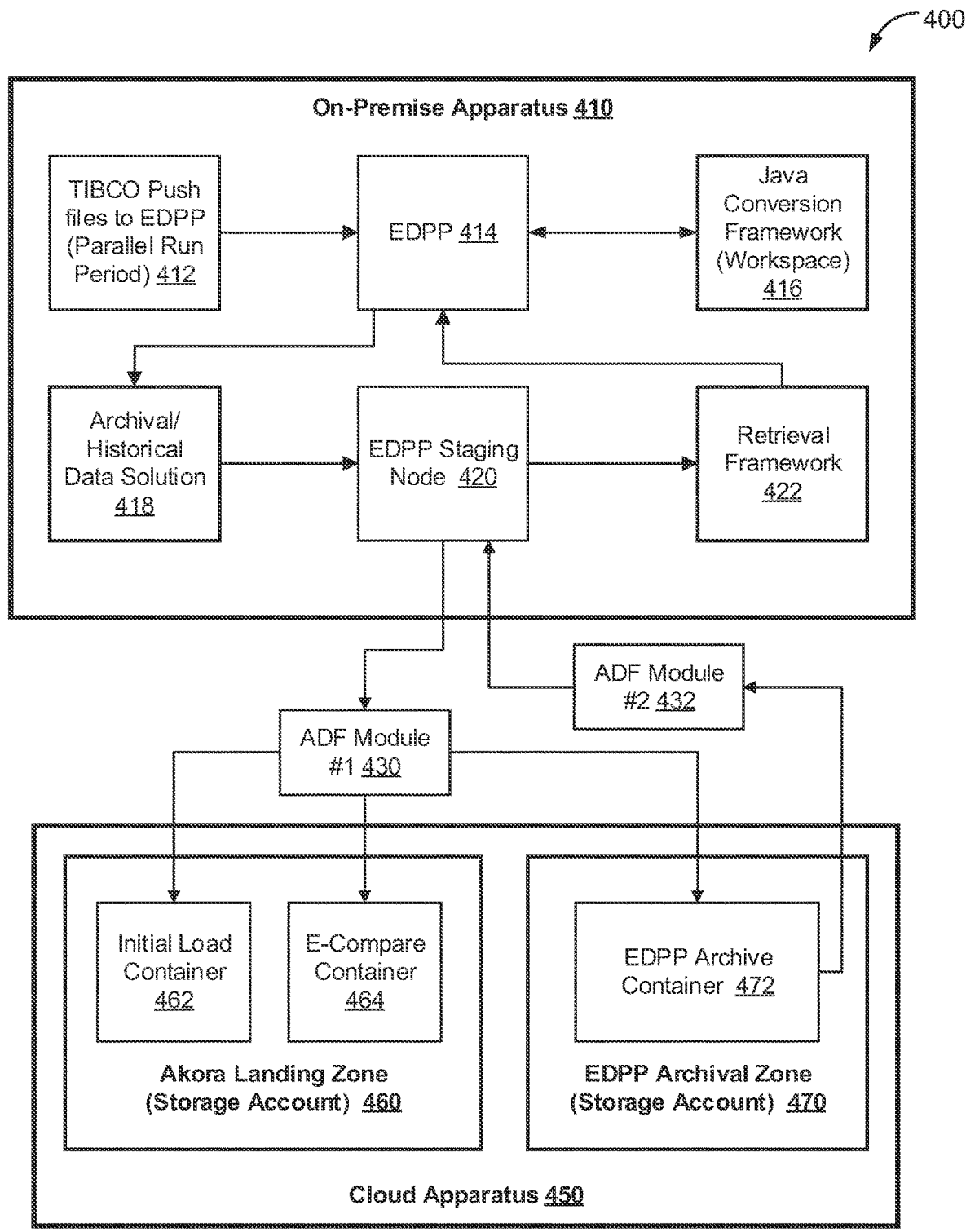
FIG. 4 illustrates a system configured for data movement from an on-premise storage system to a cloud storage system, in accordance with one or more embodiments.

FIG. 4 illustrates a system 400 configured for data movement from an on-premise storage system 410 to a cloud storage system 450, in accordance with one or more embodiments. The system includes a module 412 to push files to EDPP 414, and a Java conversion framework 416 in communication with the EDPP 414. The EDPP 414 is also in communication with and provides data to an archival/historical data solution 418, and is in communication with and receives data from a retrieval framework 422. The archival/historical data solution 418 is configured to provide data to the EDPP staging node 420, and the EDPP staging node is configured to provide data to the retrieval framework 422. In an example embodiment, the EDPP staging node 420 comprises an edge stage node on which a light application, as discussed earlier, may be provided.

The system of FIG. 4 illustrates an example implementation including a staging node 420 and two data transformation modules, such as ADF (Azure Data Factory) modules 430 and 432, in communication with the staging node. ADF is a solution for data transformation and load, which supports data movement between many on-premises and cloud data sources. The ADF modules 430 and 432 may be configured to run ADF processes to assist in moving data from a classic on premise storage system 410 to a cloud storage 450. Using the first ADF module 430, a first ADF process is configured to pull files from a staging VM, such as the staging node 420. The first ADF module 430 may also be in communication with an initial load container 462 and an e-compare container 464 within a first storage account 460, which may be described as a landing zone. Using the second ADF module 432, a second ADF process is configured to pull files from ADLS, such as an EDPP archive container 427 within an EDPP storage account 470, which may be described as an archival zone, to EDPP 414 and to use transaction log/control DB (metadata) for inventory.

Figure 5:
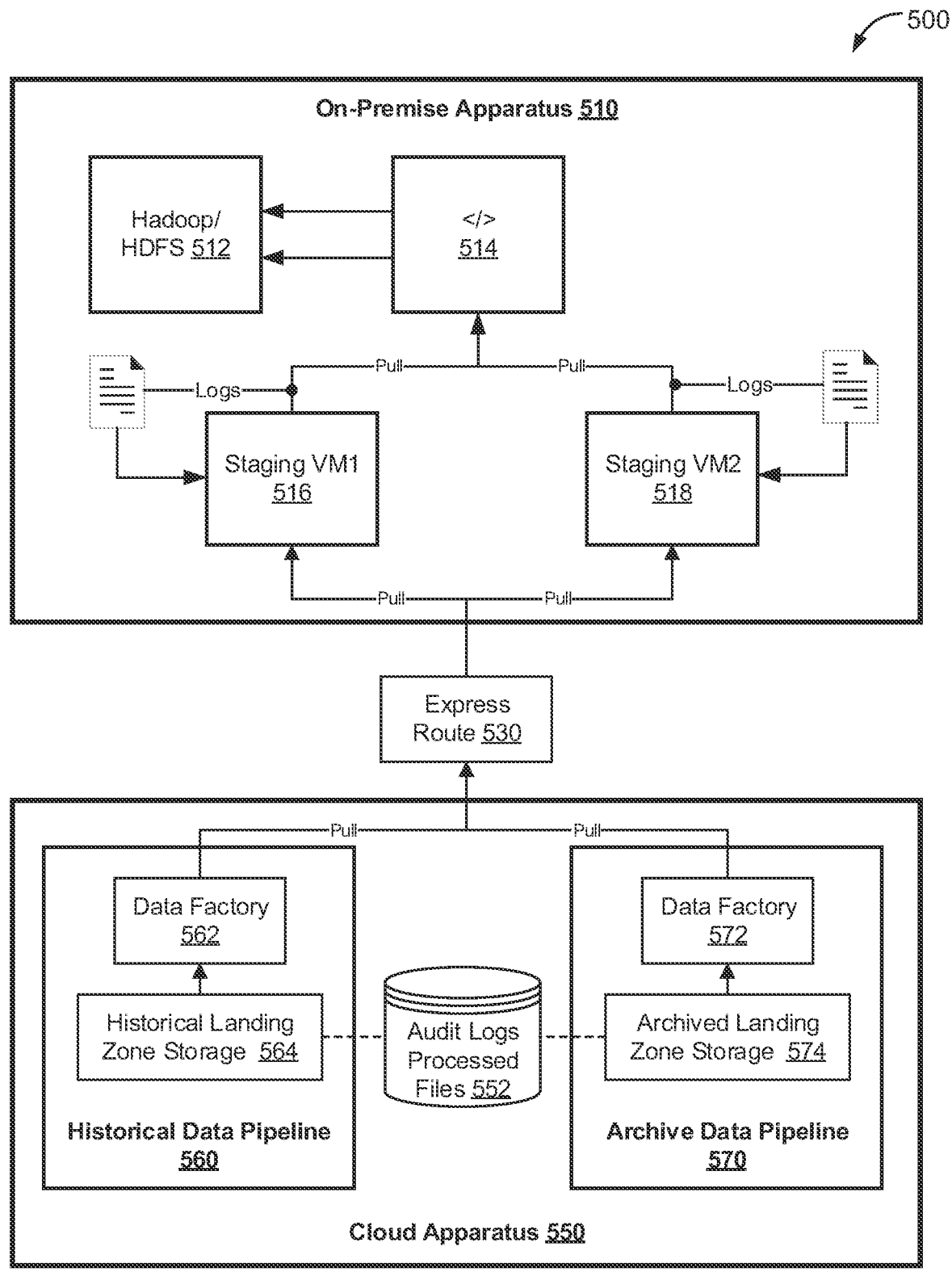
FIG. 5 illustrates another system configured for data movement from an on-premise storage system to a cloud storage system, in accordance with one or more embodiments.

FIG. 5 illustrates another system 500 configured for data movement from an on-premise storage system 510 to a cloud storage system 550, in accordance with one or more embodiments. A workflow using the system of FIG. 5 may push or pull the data through a private link service, illustrated as express route 530, rather than over the public internet. In another embodiment, any suitable network or communication means may be used. Data may be pulled from the cloud apparatus 550, for example from a historical data pipeline 560 and/or an archive data pipeline 570, and sent over the private link service or some other communication means. The historical data pipeline 570 may include historical landing zone storage 564 in communication with a first data factory 562, and the archive data pipeline 570 may include archived landing zone storage 574 in communication with a second data factory 572. In an example embodiment, first and second data factories 562 and 562 each comprise an Azure Data Factory (ADF). An audit log database 552 may be in communication with the historical landing zone storage 564 and the archived landing zone storage 574 to store processed audit logs, for example in a verification process.

At the on-premise apparatus 510, first staging VM1 516 and second staging VM 2 518 are configured to receive data from the private link service, or express route 530, and log files are extracted therefrom. Program code 514 may be configured to pull data from the first and second staging nodes to a Hadoop/HDFS data source 512. While data flow is shown in FIG. 5 as a pull, for example for data verification, in another embodiment a data push may be performed, with data flowing in the opposite direction from the on-premise apparatus 510 to the cloud apparatus 550.

As described earlier, a light process or a light application may be placed or installed on any number of nodes, for example on one or more edge stage nodes in the on-premise apparatus 510; each node may run its own independent process. In an embodiment, the one or more edge stage nodes comprise staging VM1 516 and staging VM2 518. Advantageously, in accordance with one or more embodiments, the solution may be horizontally scaled, based on splitting up different processes on different edge nodes, or edge stage nodes, to distribute on more nodes and do more at the same time, and to perform different processes. In an example implementation, everything that is processed on-premise is stored centrally in one location.

Figure 6:
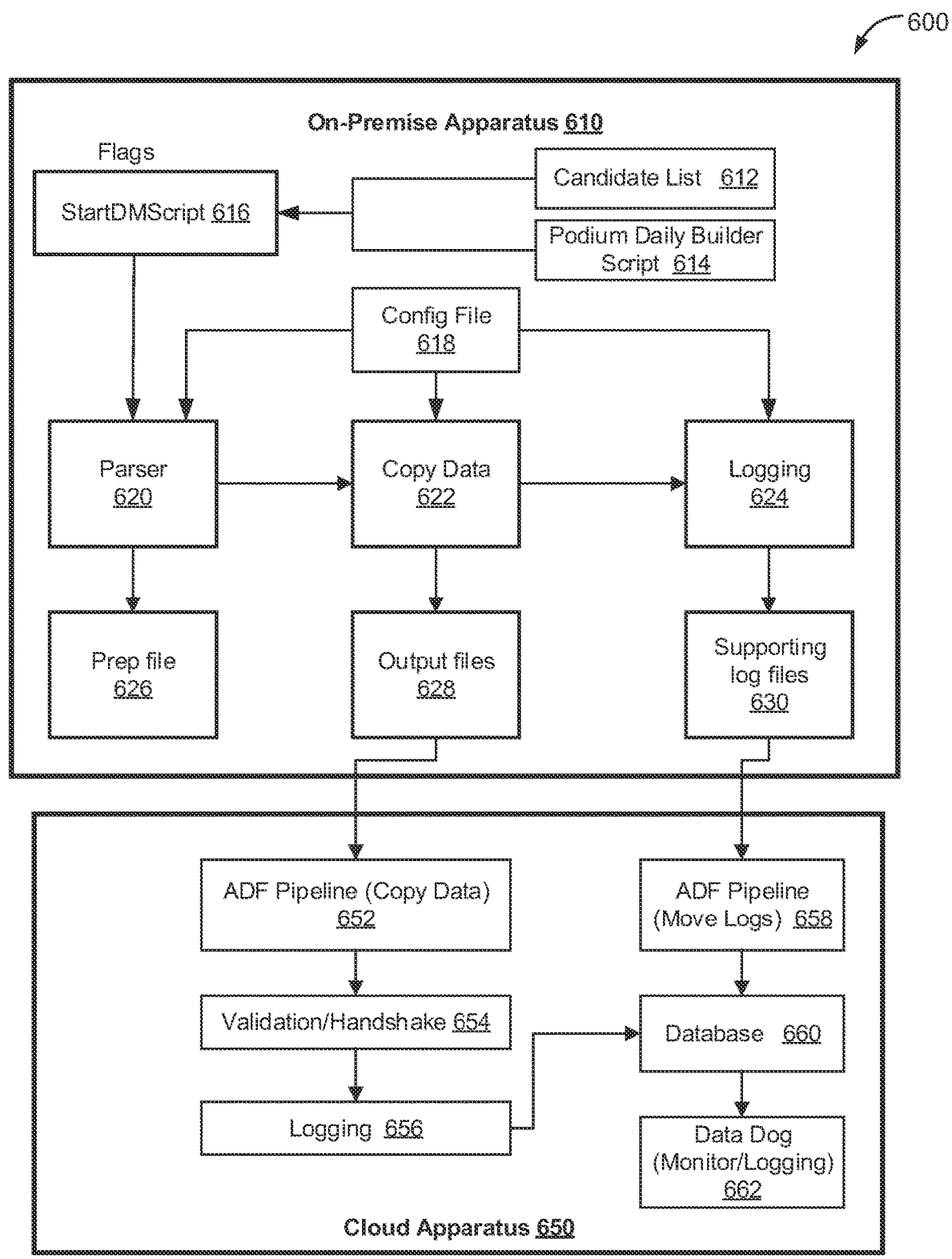
FIG. 6 illustrates a further system configured for data movement from an on-premise storage system to a cloud storage system, in accordance with one or more embodiments.

FIG. 6 illustrates a further system 600 configured for data movement from an on-premise storage system to a cloud storage system, in accordance with one or more embodiments. The system 600 may be a data movement framework. A start script module 616 is configured to allow the framework to select a flag. In an automated mode, the flag may be determined based on a property of a file or command for data movement, for example based on a candidate list 612, on a script 614, or on a configuration file 618, or on a data transfer command 130 as described in relation to FIG. 1. In a manual mode, the script may be started by manually specifying the flag, for example H, I, J.

In an example embodiment, similar to the data transfer command 130 as described earlier in relation to FIG. 1, the configuration file 618 of FIG. 6 may comprise or obtain a flag to specify details of the data transfer, and provide the details to the start script module 616. For example, the command may specify the candidate list being received, for example via candidate list 612, and may include a flag to specify a format in which, or a protocol according to which, the data is to be received, for example in a Java format, or in an archival format, or in a historical format. Based on the flag, the system 600 may be configured to perform different operations. For example, a partitioning strategy associated with Java may be different from a partitioning strategy associated with historical or archival. In an implementation, the system may run historical for one database, and on one node. In parallel, another operation may run on another database. The system may therefore horizontally scale the application to process data more quickly and more efficiently, improving operation of the associated computing devices.

The framework 600 may be configured to obtain data that has been loaded and create an automated candidate list 612 (as a way to verify data movement), and may send a copy to the cloud apparatus 650 to enable validation. The candidate list 612 may be used as a data source to verify whether migration has been completed, or has been properly completed, and may be used to ensure that the same data is not ingested more than once. The candidate list may identify a specific zone and/or partition range for all of the files that are being moved over in a particular data movement.

In an implementation, the framework uses one or more different files, which may be referenced by a configuration file. A prep file 626 may be used by a parser 620 to parse information, for example to prepare and/or amend the file such that the file is in a format in which the on-premise apparatus 610 may take the data from the cluster onto an edge stage node. One or more output files 628 may be used by a copy data module 622 to copy data. One or more supporting log files 630 may be used by a logging module 624 for logging processes. In an example embodiment, one or more of prep file 626, output file(s) 628 and supporting log files 630 may be sent as metadata files into a database in the cloud, for example into database 660 in cloud apparatus 650.

In an implementation, a data movement command may be considered similar to submitting a form: once the form is submitted, then the process is initiated to move the data from the on-premise apparatus 610 to the cloud apparatus 650, with the details of the data movement being automated by the system 600 in accordance with one or more embodiments.

An example implementation leverages ADF, as well as internal validation/handshake processes. The data may be stored in ADLS (Azure Data Lake Storage). The framework preferably includes a first component to be able to communicate with the legacy technology (e.g. EDPP), and a second component that "speaks the language" of the cloud storage system involved in the data transfer.

The system 600 may include a parser 620 configured to translate a data transfer command into an associated technical output. For example, the parser 620 may automatically determine 2 years' worth of partitions, query and put the list of the lines to copy the data over, automatically specifying the files to be transferred from the cluster to the edge stage node, then to the cloud. In an example embodiment, the data movement framework 600 also complies with privacy and data/audit control, and meets applicable standards to ensure that there is no data loss. Once the parser 620 makes its automatic determinations, a copy data module 622 may move the data into the specific location with encryption. A logging module 624 provides logging and support information, which may be included to be compliant with privacy and audit control.

In an implementation, the parser 620 in the framework 600 determines, based on the data tables and date range specified in the command 130, the specific files to be transferred. This framework 600 allows a user to use a single command 130, which may reference a CSV file, to efficiently and reliably transfer a large amount of data without the user having to specify the specific files to be transferred.

For an on-premise storage version of a file to be moved, a lot of the log files are providing metadata to provide supporting data. After the framework of an embodiment of the present disclosure has moved the data over to the cloud, an automated process may be configured to clean up data that has automatically passed the validation checks. This can be described as deleting support files after movement. The system 600 may clean up or delete files after they have been moved over. The system may also check to see if the same candidate list is being processed as a process that was already performed, to avoid duplication.

Embodiments of the present disclosure provide speed and scalability. For example, by providing a light application to be run on an edge stage node at the on-premise storage, this can scale to as many nodes as are needed. The clean-up process enables the system to clean up space, since nodes don't have as much space as the clusters themselves. For example, an edge stage node may only hold 15 to 20 terabytes, and the clean-up process provides a technical advantage and improvement in the functioning of the edge stage node. In an example implementation, the clean-up process may automatically and/or proactively be performed when an edge stage node is within a threshold capacity, such as 80% of the total available storage, improving the functioning of the edge stage node and improving the efficiency of associated memory storage. The framework focuses on different ways of speeding up transfer, and allowing classic and cloud to communicate with each other.

Embodiments of the present disclosure provide a data movement framework that moves data at the table level, and automatically determines the files associated with the specified tables/date range. In accordance with one or more embodiments, a data movement framework can move over 1 PB of data from a classic on-premise storage to the cloud. Rather than moving data at the file level as per known approaches, embodiments of the present disclosure specify data to be moved at the table level. A data transfer command may specify tables to be moved, including a date range. A parser in the framework may determine, based on the data tables and date range specified in the command, the specific files to be transferred. A framework in accordance with one or more embodiments is configured to use a single command, which may reference a CSV file, to efficiently and reliably transfer a large amount of data without a user having to specify the specific files to be transferred.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following CLAUSES, with specific features laid out in the dependent clauses:

One aspect of the present disclosure relates to a system configured for data movement. The system may include one or more hardware processors configured by machine-readable instructions. The processor(s) may be configured to obtain a data transfer command. The data transfer command may include a table-based characterization of a set of data to be transferred from an on-premise platform to a cloud platform. The data transfer command may further include a date specification. The processor(s) may be configured to automatically determine, based on the table-based characterization of the data to be transferred and based on the date specification, a set of files to be transferred. The set of files may be associated with the table-based characterization of the set of data to be transferred. The processor(s) may be configured to initiate transfer of the set of files from the on-premise platform to the cloud platform.

In some implementations of the system, initiating the transfer may include initiating a table-based transfer of the set of files from the on-premise platform to the cloud platform based on the table-based characterization of the data to be transferred and based on the date specification.

In some implementations of the system, the processor(s) may be configured to automatically determine the set of files to be transferred based on the table-based characterization of the data to be transferred and based on the date specification and independent from a file-based characterization of the set of data to be transferred.

In some implementations of the system, the processor(s) may be configured to parse the data transfer command using to automatically determine partitions associated with the table-based characterization of the data to be transferred.

In some implementations of the system, the data transfer command may include a destination location at the cloud platform. In some implementations of the system, the date specification may include a start date and an end date.

In some implementations of the system, the data transfer command may include a single line of code including a destination at the cloud platform. In some implementations of the system, the date specification may include a start date and an end date.

In some implementations of the system, the data transfer command may include reference to a preparation file for parsing information.

In some implementations of the system, the data transfer command may include reference to one or more output files used to copy data.

In some implementations of the system, the data transfer command may include reference to one or more supporting log files used for logging processes.

In some implementations of the system, the processor(s) may be configured to provide, at one or more edge stage nodes within the on-premise platform, a distributed light application configured to obtain a subset of the set of files from a storage cluster of the on-premise platform and store the subset of the set of files at the one or more edge stage nodes in an encrypted form.

In some implementations of the system, the processor(s) may be configured to store the subset of the set of files at the one or more edge stage nodes prior to storing the subset of the set of files in the cloud platform.

In some implementations of the system, the processor(s) may be configured to perform a distributed initiation of the transfer of the set of files by splitting up the transfer into a plurality of transfer processes to be performed in a distributed manner at the one or more edge stage nodes.

In some implementations of the system, the processor(s) may be configured to automatically determine data partitions in the on-premise platform associated with the date specification. In some implementations of the system, the processor(s) may be configured to automatically specify the set of files to be transferred from the storage cluster to the one or more edge stage nodes then to the cloud platform.

In some implementations of the system, the data transfer command may include a configuration filename making reference to a configuration file. In some implementations of the system, the processor(s) may be configured to automatically determine the set of files to be transferred based on at least one of the configuration filename and contents of the configuration file.

In some implementations of the system, the configuration file may include a comma separated variable file providing details associated with the table-based characterization of the set of data to be transferred. In some implementations of the system, the configuration filename may define a data transfer process to be used.

In some implementations of the system, the processor(s) may be configured to add metadata to the set of files to be transferred. In some implementations of the system, the processor(s) may be configured to initiate the transfer of the set of files and the added metadata to the cloud platform.

In some implementations of the system, the processor(s) may be configured to automatically delete the first data subset from the on-premise platform in response to a validation check confirming that the first data subset has been successfully moved over to the cloud platform.

In some implementations of the system, the processor(s) may be configured to compare the table-based characterization of the set of data to be transferred with known characterizations of previously transferred data. In some implementations of the system, the processor(s) may be configured to determine whether the set of data to be transferred includes previously transferred data, to avoid data transfer duplication.

Another aspect of the present disclosure relates to a method for data movement. The method may include obtaining a data transfer command. The data transfer command may include a table-based characterization of a set of data to be transferred from an on-premise platform to a cloud platform. The data transfer command may further include a date specification. The method may include automatically determining, based on the table-based characterization of the data to be transferred and based on the date specification, a set of files to be transferred. The set of files may be associated with the table-based characterization of the set of data to be transferred. The method may include initiating transfer of the set of files from the on-premise platform to the cloud platform.

In some implementations of the method, initiating the transfer may include initiating a table-based transfer of the set of files from the on-premise platform to the cloud platform based on the table-based characterization of the data to be transferred and based on the date specification.

In some implementations of the method, it may include automatically determining the set of files to be transferred based on the table-based characterization of the data to be transferred and based on the date specification and independent from a file-based characterization of the set of data to be transferred.

In some implementations of the method, it may include parsing the data transfer command using to automatically determine partitions associated with the table-based characterization of the data to be transferred.

In some implementations of the method, the data transfer command may include a destination location at the cloud platform. In some implementations of the method, the date specification may include a start date and an end date.

In some implementations of the method, the data transfer command may include a single line of code including a destination at the cloud platform. In some implementations of the method, the date specification may include a start date and an end date.

In some implementations of the method, the data transfer command may include reference to a preparation file for parsing information.

In some implementations of the method, the data transfer command may include reference to one or more output files used to copy data.

In some implementations of the method, the data transfer command may include reference to one or more supporting log files used for logging processes.

In some implementations of the method, it may include providing, at one or more edge stage nodes within the on-premise platform, a distributed light application configured to obtain a subset of the set of files from a storage cluster of the on-premise platform and store the subset of the set of files at the one or more edge stage nodes in an encrypted form.

In some implementations of the method, it may include storing the subset of the set of files at the one or more edge stage nodes prior to storing the subset of the set of files in the cloud platform.

In some implementations of the method, it may include performing a distributed initiation of the transfer of the set of files by splitting up the transfer into a plurality of transfer processes to be performed in a distributed manner at the one or more edge stage nodes.

In some implementations of the method, it may include automatically determining data partitions in the on-premise platform associated with the date specification. In some implementations of the method, it may include automatically specifying the set of files to be transferred from the storage cluster to the one or more edge stage nodes then to the cloud platform.

In some implementations of the method, the data transfer command may include a configuration filename making reference to a configuration file. In some implementations of the method, it may include automatically determining the set of files to be transferred based on at least one of the configuration filename and contents of the configuration file.

In some implementations of the method, the configuration file may include a comma separated variable file providing details associated with the table-based characterization of the set of data to be transferred. In some implementations of the method, the configuration filename may define a data transfer process to be used.

In some implementations of the method, it may include adding metadata to the set of files to be transferred. In some implementations of the method, it may include initiating the transfer of the set of files and the added metadata to the cloud platform.

In some implementations of the method, it may include automatically deleting the first data subset from the on-premise platform in response to a validation check confirming that the first data subset has been successfully moved over to the cloud platform.

In some implementations of the method, it may include comparing the table-based characterization of the set of data to be transferred with known characterizations of previously transferred data. In some implementations of the method, it may include determining whether the set of data to be transferred includes previously transferred data, to avoid data transfer duplication.

Yet another aspect of the present disclosure relates to a non-transient computer-readable storage medium having instructions embodied thereon, the instructions being executable by one or more processors to perform a method for data movement. The method may include obtaining a data transfer command. The data transfer command may include a table-based characterization of a set of data to be transferred from an on-premise platform to a cloud platform. The data transfer command may further include a date specification. The method may include automatically determining, based on the table-based characterization of the data to be transferred and based on the date specification, a set of files to be transferred. The set of files may be associated with the table-based characterization of the set of data to be transferred. The method may include initiating transfer of the set of files from the on-premise platform to the cloud platform.

In some implementations of the computer-readable storage medium, initiating the transfer may include initiating a table-based transfer of the set of files from the on-premise platform to the cloud platform based on the table-based characterization of the data to be transferred and based on the date specification.

In some implementations of the computer-readable storage medium, the method may include automatically determining the set of files to be transferred based on the table-based characterization of the data to be transferred and based on the date specification and independent from a file-based characterization of the set of data to be transferred.

In some implementations of the computer-readable storage medium, the method may include parsing the data transfer command using to automatically determine partitions associated with the table-based characterization of the data to be transferred.

In some implementations of the computer-readable storage medium, the data transfer command may include a destination location at the cloud platform. In some implementations of the computer-readable storage medium, the date specification may include a start date and an end date.

In some implementations of the computer-readable storage medium, the data transfer command may include a single line of code including a destination at the cloud platform. In some implementations of the computer-readable storage medium, the date specification may include a start date and an end date.

In some implementations of the computer-readable storage medium, the data transfer command may include reference to a preparation file for parsing information.

In some implementations of the computer-readable storage medium, the data transfer command may include reference to one or more output files used to copy data.

In some implementations of the computer-readable storage medium, the data transfer command may include reference to one or more supporting log files used for logging processes.

In some implementations of the computer-readable storage medium, the method may include providing, at one or more edge stage nodes within the on-premise platform, a distributed light application configured to obtain a subset of the set of files from a storage cluster of the on-premise platform and store the subset of the set of files at the one or more edge stage nodes in an encrypted form.

In some implementations of the computer-readable storage medium, the method may include storing the subset of the set of files at the one or more edge stage nodes prior to storing the subset of the set of files in the cloud platform.

In some implementations of the computer-readable storage medium, the method may include performing a distributed initiation of the transfer of the set of files by splitting up the transfer into a plurality of transfer processes to be performed in a distributed manner at the one or more edge stage nodes.

In some implementations of the computer-readable storage medium, the method may include automatically determining data partitions in the on-premise platform associated with the date specification. In some implementations of the computer-readable storage medium, the method may include automatically specifying the set of files to be transferred from the storage cluster to the one or more edge stage nodes then to the cloud platform.

In some implementations of the computer-readable storage medium, the data transfer command may include a configuration filename making reference to a configuration file. In some implementations of the computer-readable storage medium, the method may include automatically determining the set of files to be transferred based on at least one of the configuration filename and contents of the configuration file.

In some implementations of the computer-readable storage medium, the configuration file may include a comma separated variable file providing details associated with the table-based characterization of the set of data to be transferred. In some implementations of the computer-readable storage medium, the configuration filename may define a data transfer process to be used.

In some implementations of the computer-readable storage medium, the method may include adding metadata to the set of files to be transferred. In some implementations of the computer-readable storage medium, the method may include initiating the transfer of the set of files and the added metadata to the cloud platform.

In some implementations of the computer-readable storage medium, the method may include automatically deleting the first data subset from the on-premise platform in response to a validation check confirming that the first data subset has been successfully moved over to the cloud platform.

In some implementations of the computer-readable storage medium, the method may include comparing the table-based characterization of the set of data to be transferred with known characterizations of previously transferred data. In some implementations of the computer-readable storage medium, the method may include determining whether the set of data to be transferred includes previously transferred data, to avoid data transfer duplication.

Still another aspect of the present disclosure relates to a system configured for data movement. The system may include means for obtaining a data transfer command. The data transfer command may include a table-based characterization of a set of data to be transferred from an on-premise platform to a cloud platform. The data transfer command may further include a date specification. The system may include means for automatically determining, based on the table-based characterization of the data to be transferred and based on the date specification, a set of files to be transferred. The set of files may be associated with the table-based characterization of the set of data to be transferred. The system may include means for initiating transfer of the set of files from the on-premise platform to the cloud platform.

In some implementations of the system, initiating the transfer may include initiating a table-based transfer of the set of files from the on-premise platform to the cloud platform based on the table-based characterization of the data to be transferred and based on the date specification.

In some implementations of the system, the system may include means for automatically determining the set of files to be transferred based on the table-based characterization of the data to be transferred and based on the date specification and independent from a file-based characterization of the set of data to be transferred.

In some implementations of the system, the system may include means for parsing the data transfer command using to automatically determine partitions associated with the table-based characterization of the data to be transferred.

In some implementations of the system, the data transfer command may include a destination location at the cloud platform. In some implementations of the system, the date specification may include a start date and an end date.

In some implementations of the system, the data transfer command may include a single line of code including a destination at the cloud platform. In some implementations of the system, the date specification may include a start date and an end date.

In some implementations of the system, the data transfer command may include reference to a preparation file for parsing information.

In some implementations of the system, the data transfer command may include reference to one or more output files used to copy data.

In some implementations of the system, the data transfer command may include reference to one or more supporting log files used for logging processes.

In some implementations of the system, the system may include means for providing, at one or more edge stage nodes within the on-premise platform, a distributed light application configured to obtain a subset of the set of files from a storage cluster of the on-premise platform and store the subset of the set of files at the one or more edge stage nodes in an encrypted form.

In some implementations of the system, the system may include means for storing the subset of the set of files at the one or more edge stage nodes prior to storing the subset of the set of files in the cloud platform.

In some implementations of the system, the system may include means for performing a distributed initiation of the transfer of the set of files by splitting up the transfer into a plurality of transfer processes to be performed in a distributed manner at the one or more edge stage nodes.

In some implementations of the system, the system may include means for automatically determining data partitions in the on-premise platform associated with the date specification. In some implementations of the system, the system may include means for automatically specifying the set of files to be transferred from the storage cluster to the one or more edge stage nodes then to the cloud platform.

In some implementations of the system, the data transfer command may include a configuration filename making reference to a configuration file. In some implementations of the system, the system may include means for automatically determining the set of files to be transferred based on at least one of the configuration filename and contents of the configuration file.

In some implementations of the system, the configuration file may include a comma separated variable file providing details associated with the table-based characterization of the set of data to be transferred. In some implementations of the system, the configuration filename may define a data transfer process to be used.

In some implementations of the system, the system may include means for adding metadata to the set of files to be transferred. In some implementations of the system, the system may include means for initiating the transfer of the set of files and the added metadata to the cloud platform.

In some implementations of the system, the system may include means for automatically deleting the first data subset from the on-premise platform in response to a validation check confirming that the first data subset has been successfully moved over to the cloud platform.

In some implementations of the system, the system may include means for comparing the table-based characterization of the set of data to be transferred with known characterizations of previously transferred data. In some implementations of the system, the system may include means for determining whether the set of data to be transferred includes previously transferred data, to avoid data transfer duplication.

Even another aspect of the present disclosure relates to a computing platform configured for data movement. The computing platform may include a non-transient computer-readable storage medium having executable instructions embodied thereon. The computing platform may include one or more hardware processors configured to execute the instructions. The processor(s) may execute the instructions to obtain a data transfer command. The data transfer command may include a table-based characterization of a set of data to be transferred from an on-premise platform to a cloud platform. The data transfer command may further include a date specification. The processor(s) may execute the instructions to automatically determine, based on the table-based characterization of the data to be transferred and based on the date specification, a set of files to be transferred. The set of files may be associated with the table-based characterization of the set of data to be transferred. The processor(s) may execute the instructions to initiate transfer of the set of files from the on-premise platform to the cloud platform.

In some implementations of the computing platform, initiating the transfer may include initiating a table-based transfer of the set of files from the on-premise platform to the cloud platform based on the table-based characterization of the data to be transferred and based on the date specification.

In some implementations of the computing platform, the processor(s) may execute the instructions to automatically determine the set of files to be transferred based on the table-based characterization of the data to be transferred and based on the date specification and independent from a file-based characterization of the set of data to be transferred.

In some implementations of the computing platform, the processor(s) may execute the instructions to parse the data transfer command using to automatically determine partitions associated with the table-based characterization of the data to be transferred.

In some implementations of the computing platform, the data transfer command may include a destination location at the cloud platform. In some implementations of the computing platform, the date specification may include a start date and an end date.

In some implementations of the computing platform, the data transfer command may include a single line of code including a destination at the cloud platform. In some implementations of the computing platform, the date specification may include a start date and an end date.

In some implementations of the computing platform, the data transfer command may include reference to a preparation file for parsing information.

In some implementations of the computing platform, the data transfer command may include reference to one or more output files used to copy data.

In some implementations of the computing platform, the data transfer command may include reference to one or more supporting log files used for logging processes.

In some implementations of the computing platform, the processor(s) may execute the instructions to provide, at one or more edge stage nodes within the on-premise platform, a distributed light application configured to obtain a subset of the set of files from a storage cluster of the on-premise platform and store the subset of the set of files at the one or more edge stage nodes in an encrypted form.

In some implementations of the computing platform, the processor(s) may execute the instructions to store the subset of the set of files at the one or more edge stage nodes prior to storing the subset of the set of files in the cloud platform.

In some implementations of the computing platform, the processor(s) may execute the instructions to perform a distributed initiation of the transfer of the set of files by splitting up the transfer into a plurality of transfer processes to be performed in a distributed manner at the one or more edge stage nodes.

In some implementations of the computing platform, the processor(s) may execute the instructions to automatically determine data partitions in the on-premise platform associated with the date specification. In some implementations of the computing platform, the processor(s) may execute the instructions to automatically specify the set of files to be transferred from the storage cluster to the one or more edge stage nodes then to the cloud platform.

In some implementations of the computing platform, the data transfer command may include a configuration filename making reference to a configuration file. In some implementations of the computing platform, the processor(s) may execute the instructions to automatically determine the set of files to be transferred based on at least one of the configuration filename and contents of the configuration file.

In some implementations of the computing platform, the configuration file may include a comma separated variable file providing details associated with the table-based characterization of the set of data to be transferred. In some implementations of the computing platform, the configuration filename may define a data transfer process to be used.

In some implementations of the computing platform, the processor(s) may execute the instructions to add metadata to the set of files to be transferred. In some implementations of the computing platform, the processor(s) may execute the instructions to initiate the transfer of the set of files and the added metadata to the cloud platform.

In some implementations of the computing platform, the processor(s) may execute the instructions to automatically delete the first data subset from the on-premise platform in response to a validation check confirming that the first data subset has been successfully moved over to the cloud platform.

In some implementations of the computing platform, the processor(s) may execute the instructions to compare the table-based characterization of the set of data to be transferred with known characterizations of previously transferred data. In some implementations of the computing platform, the processor(s) may execute the instructions to determine whether the set of data to be transferred includes previously transferred data, to avoid data transfer duplication.

What is claimed is:

1. An apparatus configured for processing instructions associated with one or more data transfers, the apparatus comprising:
   a non-transient computer-readable storage medium having executable instructions embodied thereon; and
   one or more hardware processors configured to execute the instructions to:
      obtain a data transfer command, the data transfer command including a table-based characterization of a set of data to be transferred from an on-premise platform to a cloud platform, the data transfer command further including a date specification;
      automatically determine, based on the table-based characterization of the data to be transferred and based on the date specification, a set of files to be transferred, the set of files being associated with the table-based characterization of the set of data to be transferred; and
      initiate transfer of the set of files from the on-premise platform to the cloud platform.

2. The apparatus of claim 1 wherein the one or more hardware processors are further configured to execute the instructions to:
   provide, at one or more edge stage nodes within the on-premise platform, a distributed light application configured to obtain a subset of the set of files from a storage cluster of the on-premise platform and store the subset of the set of files at the one or more edge stage nodes in an encrypted form.

3. The apparatus of claim 2 wherein the one or more hardware processors are further configured to execute the instructions to:
   perform a distributed initiation of the transfer of the set of files by splitting up the transfer into a plurality of transfer processes to be performed in a distributed manner at the one or more edge stage nodes.

4. The apparatus of claim 2 wherein the one or more hardware processors are further configured to execute the instructions to:
   automatically determine data partitions in the on-premise platform associated with the date specification, and
   automatically specify the set of files to be transferred from the storage cluster to the one or more edge stage nodes, then to the cloud platform.

5. The apparatus of claim 1 wherein the data transfer command includes a configuration filename making reference to a configuration file, and the one or more hardware processors are further configured to execute the instructions to:

automatically determine the set of files to be transferred based on at least one of the configuration filename and contents of the configuration file.

6. The apparatus of claim 1 wherein the set of data to be transferred comprises a first data subset, and wherein the one or more hardware processors are further configured to execute the instructions to:
automatically delete the first data subset from the on-premise platform in response to a validation check confirming that the first data subset has been successfully moved over to the cloud platform.

7. The apparatus of claim 1 wherein the one or more hardware processors are further configured to execute the instructions to:
initiate the transfer comprises initiating a table-based transfer of the set of files from the on-premise platform to the cloud platform based on the table-based characterization of the data to be transferred and based on the date specification.

8. The apparatus of claim 1 wherein the one or more hardware processors are further configured to execute the instructions to:
automatically determine the set of files to be transferred based on the table-based characterization of the data to be transferred and based on the date specification and independent from a file-based characterization of the set of data to be transferred.

9. The apparatus of claim 1 wherein the one or more hardware processors are further configured to execute the instructions to:
compare the table-based characterization of the set of data to be transferred with known characterizations of previously transferred data; and
determine whether the set of data to be transferred includes previously transferred data, to avoid data transfer duplication.

10. A computer-implemented method for expanding a data transfer framework, the method comprising:
obtaining a data transfer command, the data transfer command including a table-based characterization of a set of data to be transferred from an on-premise platform to a cloud platform, the data transfer command further including a date specification;
automatically determining, based on the table-based characterization of the data to be transferred and based on the date specification, a set of files to be transferred, the set of files being associated with the table-based characterization of the set of data to be transferred; and
initiating transfer of the set of files from the on-premise platform to the cloud platform.

11. The method of claim 10 wherein:
initiating the transfer comprises initiating a table-based transfer of the set of files from the on-premise platform to the cloud platform based on the table-based characterization of the data to be transferred and based on the date specification.

12. The method of claim 10 further comprising:
automatically determining the set of files to be transferred based on the table-based characterization of the data to be transferred and based on the date specification and independent from a file-based characterization of the set of data to be transferred.

13. The method of claim 10 further comprising:
providing, at one or more edge stage nodes within the on-premise platform, a distributed light application configured to obtain a subset of the set of files from a storage cluster of the on-premise platform and store the subset of the set of files at the one or more edge stage nodes in an encrypted form.

14. The method of claim 13 further comprising:
performing a distributed initiation of the transfer of the set of files by splitting up the transfer into a plurality of transfer processes to be performed in a distributed manner at the one or more edge stage nodes.

15. The method of claim 13 further comprising:
automatically determining data partitions in the on-premise platform associated with the date specification, and
automatically specifying the set of files to be transferred from the storage cluster to the one or more edge stage nodes, then to the cloud platform.

16. The method of claim 10 wherein:
the data transfer command includes a configuration filename making reference to a configuration file, and the method further comprises;
automatically determining the set of files to be transferred based on at least one of the configuration filename and contents of the configuration file.

17. The method of claim 10 wherein the set of data to be transferred comprises a first data subset, the method further comprising:
automatically deleting the first data subset from the on-premise platform in response to a validation check confirming that the first data subset has been successfully moved over to the cloud platform.

18. The method of claim 10 further comprising:
comparing the table-based characterization of the set of data to be transferred with known characterizations of previously transferred data; and
determining whether the set of data to be transferred includes previously transferred data, to avoid data transfer duplication.

19. A non-transient computer-readable storage medium having instructions embodied thereon, the instructions being executable by one or more processors to perform a method for providing data access, the method comprising:
obtaining a data transfer command, the data transfer command including a table-based characterization of a set of data to be transferred from an on-premise platform to a cloud platform, the data transfer command further including a date specification;
automatically determining, based on the table-based characterization of the data to be transferred and based on the date specification, a set of files to be transferred, the set of files being associated with the table-based characterization of the set of data to be transferred; and
initiating transfer of the set of files from the on-premise platform to the cloud platform.

20. The non-transient computer-readable storage medium of claim 19 wherein the set of data to be transferred comprises a first data subset, and the method further comprises:
automatically deleting the first data subset from the on-premise platform in response to a validation check confirming that the first data subset has been successfully moved over to the cloud platform.

* * * * *